(12) United States Patent
AbuSamra

(10) Patent No.: US 9,004,252 B2
(45) Date of Patent: Apr. 14, 2015

(54) TRANSMISSION SHIFTING ELEMENT DECELERATOR

(75) Inventor: Muneer AbuSamra, Gainesville, GA (US)

(73) Assignee: ZF Friedrichshafen AG, Friedrichshafen (DE)

( * ) Notice: Subject to any disclaimer, the term of this patent is extended or adjusted under 35 U.S.C. 154(b) by 499 days.

(21) Appl. No.: 13/371,772

(22) Filed: Feb. 13, 2012

(65) Prior Publication Data

US 2013/0206539 A1    Aug. 15, 2013

(51) Int. Cl.
| | | |
|---|---|---|
| *F16D 25/0635* | (2006.01) | |
| *F16D 13/00* | (2006.01) | |
| *F16D 25/063* | (2006.01) | |
| *F16D 48/02* | (2006.01) | |

(52) U.S. Cl.
CPC ...... *F16D 25/063* (2013.01); *F16D 2048/0212* (2013.01)

(58) Field of Classification Search
CPC .............. F16D 25/044; F16D 28/0635; F16D 2048/0212
USPC ............ 192/85.27, 85.34, 85.59, 109 F, 52.4; 92/85 A, 85 B, 84
See application file for complete search history.

(56) References Cited

U.S. PATENT DOCUMENTS 6,920,971 B2 *   7/2005   Creger .................... 192/85.34

* cited by examiner

*Primary Examiner* — Edwin A Young
*Assistant Examiner* — Colby M Hansen
(74) *Attorney, Agent, or Firm* — Brinks Gilson & Lione

(57) ABSTRACT

A transmission may include gears and a clutch to allow the transfer of torque, at a variety of gear ratios, between an input shaft and an output shaft. The clutch may include a cushion piston to decrease the velocity of a transmission piston before the transmission piston engages a clutch element. The cushion piston may be contained within the transmission piston and configured so the cushion piston ceases movement toward the clutch element before the transmission piston. The pistons may be coupled together such that the cushion piston may resist movement of transmission piston toward the clutch element.

18 Claims, 8 Drawing Sheets

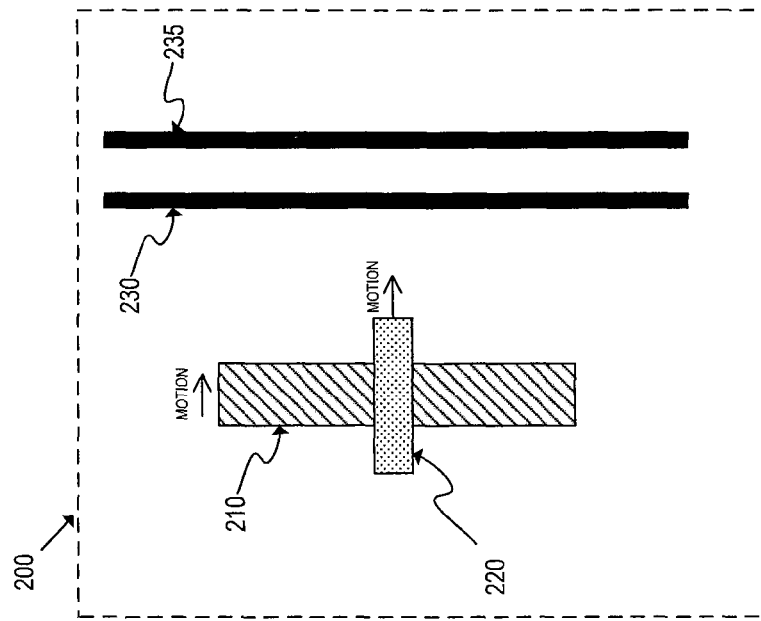
Figure 2A
(Time 1)
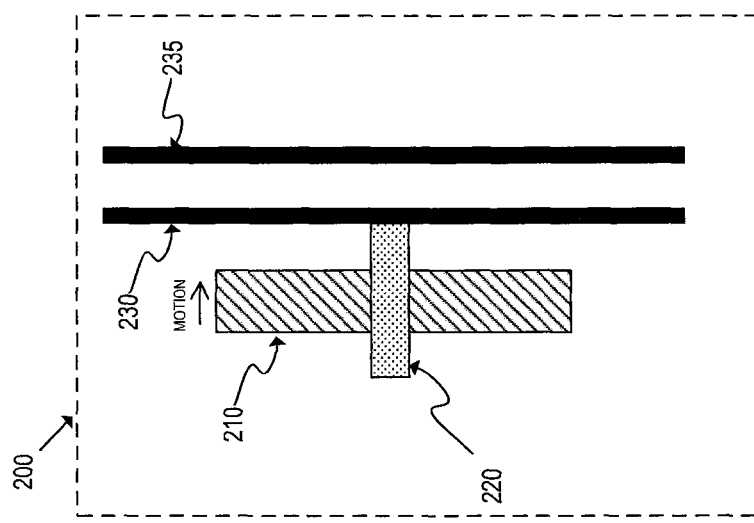
Figure 2B
(Time 2)
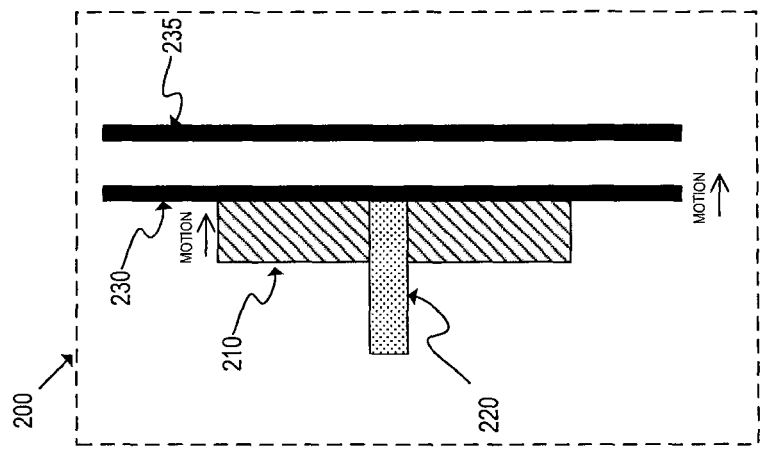
Figure 2C
(Time 3)
Figure 2

TRANSMISSION SHIFTING ELEMENT DECELERATOR

BACKGROUND OF THE INVENTION

1. Field of the Invention

The invention relates to transmissions with shifting elements. In particular, the invention relates to automatic transmissions with transmission piston decelerators.

2. Related Art

Transmissions transfer torque between input shafts, powered by engines or motors, and output shafts that drive devices, such as wheels or belts. Within the transmission, transmission pistons provide a means to engage and disengage clutches that transfer torque from one device to another, such as during the transition from one gear ratio to another. During the engagement of the clutch, jerky, shocking motion may occur when rotating clutch plates rapidly make contact with stationary clutch plates.

Traditionally, separator springs have been used to decelerate the pistons before they engage the clutch plates to provide a smoother engagement of the clutch. However, it may be difficult to obtain the correct spring characteristics to help decelerate the piston without compromising on the load and torque transfer requirements. Spring separators also add another component to the clutch assembly. This adds to material and production costs. Additionally, spring separators introduce drag that may inhibit smooth engagement and disengagement of the clutch. Also, software and control calibration may be used to fine tune the engagement, disengagement, and deceleration of the piston. Calibration is time consuming and does not cover all tolerance ranges of the shifting elements. Removing the spring separators simplifies and speeds up the calibration process by eliminating a variable. Thus, there is a need for a transmission piston decelerator that does not require spring separators and reduces the time required for calibration.

SUMMARY OF THE INVENTION

The descriptions below include apparatuses for decelerating transmission pistons. The apparatus may include a cushion piston within the transmission piston. The cushion piston may engage the clutch plate before the transmission piston and correspondingly may decelerate the transmission piston before it makes contact with the clutch plate. Decelerating the transmission piston before it contacts the clutch plate provides a smooth engagement of the clutch.

According to one embodiment of the invention, the transmission comprises an input shaft; an output shaft; a transmission assembly mechanically connected to the input shaft and the output shaft, where the transmission assembly comprises a gear set and a clutch assembly, wherein the clutch assembly comprises a first piston, a second piston that is movably mounted within the first piston, and a clutch element, wherein the second piston resists the movement of the first piston for a predetermined distance from the clutch element.

According to another embodiment of the invention, the transmission shifting element decelerator comprises a first piston; a pressurized fluid that is configured to move the first piston in a plane perpendicular to a face of a clutch plate; a second piston movably mounted within the first piston and configured to allow the pressurized fluid to move the second piston in the plane perpendicular to the clutch plate; a first spring connected between the first piston and the second piston and configured to resist movement of the second piston in a direction toward the clutch plate; and a second spring connected between the first piston and the second piston and configured to resist movement of the second piston in a direction away from the clutch plate, wherein a portion of the second piston extends outside the first piston and engages the clutch plate before the first piston engages the clutch plate.

According to another embodiment of the invention, the transmission shifting element decelerator comprises a first piston; a pressurized fluid that is configured to move the first piston toward a clutch element; a second piston movable mounted within the first piston and configured to allow the pressurized fluid to move the second piston toward the clutch element; a first spring connected between the first piston and the second piston and configured to resist movement of the second piston in a direction toward the clutch element; and a second spring connected between the first piston and the second piston and configured to resist movement of the second piston in a direction away from the clutch element, wherein a portion of the second piston extends outside the first piston and movement of the second piston toward the clutch element substantially ceases before movement of the first piston toward the clutch element ceases.

According to another embodiment of the invention, a method for decelerating a transmission piston comprises the steps of pressurizing a fluid on one side of a transmission piston; moving the transmission piston toward a clutch element with the pressurized fluid; and moving a second piston contained within the transmission piston and coupled to the transmission piston toward the clutch element with the pressurized fluid such that movement of the second piston toward the clutch element substantially ceases before the transmission piston reaches the clutch element and where the second piston resists movement of the transmission piston toward the clutch element.

Other systems, methods, features and advantages will be, or will become, apparent to one with skill in the art upon examination of the following figures and detailed description. It is intended that all such additional systems, methods, features and advantages be included within this description, be within the scope of the invention, and be protected by the following claims.

BRIEF DESCRIPTION OF THE DRAWINGS

The embodiments described below may be more fully understood by reading the following description in conjunction with the drawings, in which

FIG. 2 is an illustration of a transmission piston and clutch plates that includes a cushion piston according to one embodiment of the invention;

DETAILED DESCRIPTION

The described embodiments include a transmission with a shifting element decelerator that may decelerate a transmission piston before it engages a clutch element. A transmission piston that is decelerated before engaging a clutch element may provide a smooth transition between gear ratios while still allowing a rapid response during full power gear shifting. A decelerated transmission piston may also reduce the noise generated during the engagement and disengagement of clutch elements. A cushion piston may be used to engage the clutch element before the transmission piston and resist the movement of the transmission piston toward the clutch element, eliminating the need for spring separators to decelerate the transmission piston. Multiple cushion pistons may be used with a single transmission piston and the cushion pistons may be nested together to provide a multi-stage decelerator. The cushion piston may be built within the transmission piston and may be used with single or double acting transmission pistons. The cushion piston may be precisely designed and produced, reducing the calibration time required. Additionally, the embodiments may assist with the problem of clutch fill-in and relief speeds of oil. The embodiments may also help maintain a constant flow and speed of oil, as well as provide greater control of the transmission piston, when the transmission piston nears the clutch element.

The disclosed embodiments may be used to decelerate pistons in other similar applications where pistons engage mechanical elements, such as, for example, electromagnetic fluid metallic pistons and pistons that engage brake pads. The specification covers these other applications, but clutch applications are discussed for simplicity.

Figure 1:
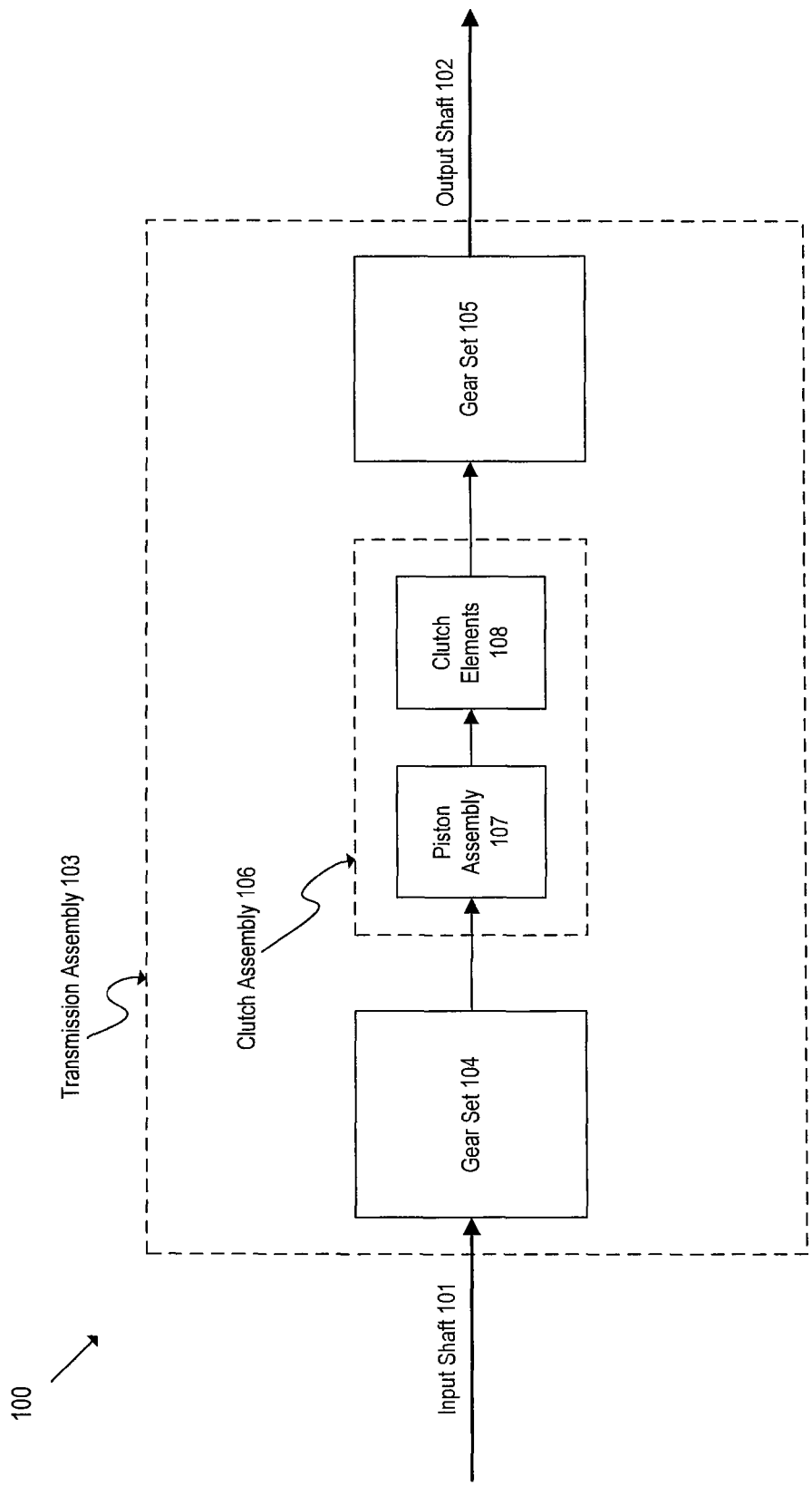
FIG. 1 is a block diagram of a transmission according to one embodiment of the invention.

FIG. 1 illustrates transmission 100, including input shaft 101, output shaft 102, and transmission assembly 103, according to one embodiment of the invention. Torque is provided to input shaft 101 by a drive mechanism (not shown), for example, an internal combustion engine or an electric motor. Transmission assembly 103 transmits torque from input shaft 101 to output shaft 102. Transmission assembly 103 includes gear sets 104, 105, and clutch assembly 106. Gear sets 104, 105 may include a variety of gears to allow transmission assembly 100 to efficiently transfer torque using different gear ratios. Clutch assembly 106 may engage and disengage to allow transmission assembly 103 to change gear ratios.

Clutch assembly 106 includes piston assembly 107 and clutch elements 108. Clutch elements 108 may be, for example, clutch plates or rotating dog clutch elements. Piston assembly 107 may contact clutch elements 108, causing clutch elements 108 to engage and rotate as a unit, transferring torque between input shaft 101 and output shaft 102. Piston assembly 107 may be configured to decrease its velocity before contacting clutch elements 108, which may provide a smooth engagement between individual clutch elements contained within clutch elements 108.

FIGS. 2A, 2B, and 2C illustrate transmission piston decelerator unit 200 that includes transmission piston 210, clutch plates 230, 235, and cushion piston 220 according to one embodiment of the invention. A transmission piston or cushion piston may be, for example, metal, plastic, or rubber. Cushion piston 220 may be partially or completely located within transmission piston 210. Multiple cushion pistons 220 may be partially or completely located within, and act on, a single transmission piston 210. The location of cushion piston 220 is not restricted to the vertical midpoint of transmission piston 210, cushion piston 220 may be located anywhere within transmission piston 210. Additionally, cushion pistons 220 may be nested within each other, providing a multi-stage or telescoping cushion piston 220. Cushion piston 220 may be configured to resist the movement of transmission piston 210 toward clutch plate 230. The resistance provided by cushion piston 220 may serve to advantageously decelerate transmission piston 210 before it engages clutch plate 230. Clutch plates 230 and 235 may represent multiple sets of clutch elements in traditional clutch pack assemblies, including dog clutches, dry clutches, wet clutches, single-plate clutches or multi-plate clutches. Clutch plate 230 may be stationary and clutch plate 235 may be rotating. Conversely, clutch plate 230 may be rotating and clutch plate 235 may be stationary. Individual clutch plates 230 and 235 may rotate together as a unit when they are compressed together by transmission piston 210. Transmission piston decelerator unit 200 may be installed in an automatic transmission (not shown) in an automobile, or any other type of vehicle.

FIG. 2A depicts the initial operation (time 1) of the transmission piston decelerator unit 200, when transmission piston 210 and cushion piston 220 begin moving in the same direction toward clutch plates 230, 235. Transmission piston 210 and cushion piston 220 may be induced to move by, for example, pressurized fluid, mechanical force, or electromagnetic force.

FIG. 2B depicts subsequent operation (time 2) of the transmission piston decelerator unit 200, when cushion piston 220 engages clutch plate 230. Cushion piston 220 substantially ceases movement upon engagement with clutch plate 230. Transmission piston 210 continues to move toward clutch plate 230. The movement of transmission piston 210 toward clutch plate 230 may be resisted by cushion piston 220. The resistance may be provided by friction or a coupling between transmission piston 210 and cushion piston 220. The resistance provided by cushion piston 220 may decelerate transmission piston 210 before it engages clutch plate 230.

FIG. 2C depicts a further subsequent operation (time 3) of the transmission piston decelerator unit 200, when transmission piston 210 has engaged clutch plate 230. Transmission piston 210 may apply pressure on clutch plate 230, causing clutch plate 230 to move toward clutch plate 235. Cushion piston 220 may remain engaged with clutch plate 230. Transmission piston 210 compresses clutch plate 230 and clutch plate 235 together, causing any torque from one clutch plate to be transferred to the other clutch plate.

Figure 3:
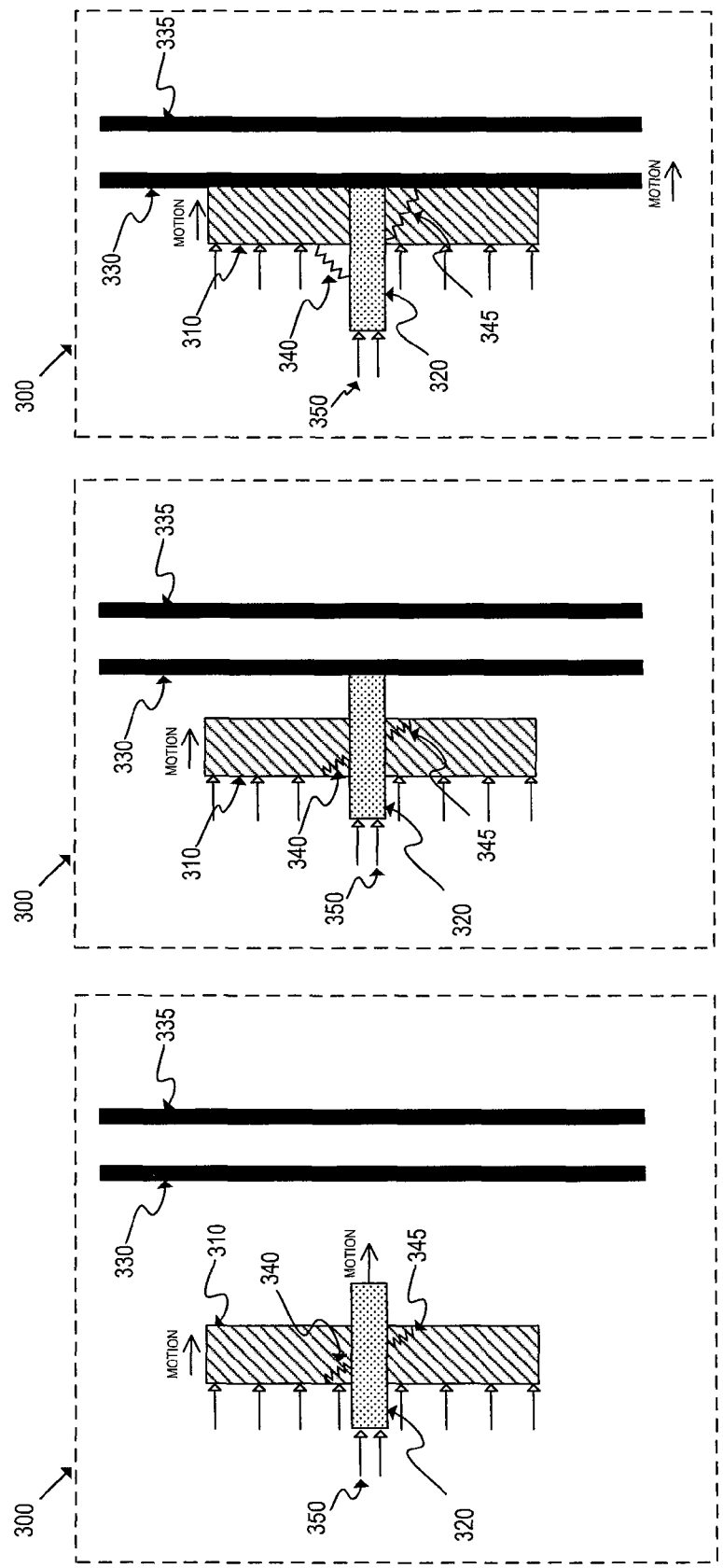
FIG. 3 is an illustration of a transmission piston and clutch plates that includes a cushion piston according to another embodiment of the invention.

FIGS. 3A, 3B, and 3C illustrate schematic diagrams of a transmission piston decelerator unit 300 according to another embodiment of the invention. Springs 340, 345 and pressurized fluid 350 have been added to transmission piston decelerator unit 300. Cushion piston 320 may be partially or completely located within transmission piston 310. Multiple cushion pistons 320 may be partially or completely located within, and act on, a single transmission piston 310. The location of cushion piston 320 is not restricted to the vertical midpoint of transmission piston 310, cushion piston 320 may be located anywhere within transmission piston 310. Additionally, cushion pistons 320 may be nested within each other, providing a multi-stage or telescoping cushion piston 320. Cushion piston 320 may be mechanically coupled to transmission piston 310 by springs 340, 345. Cushion piston 320 may be coupled to transmission piston 310 by other means including guides, pins, tethers, hydraulics, or electromagnetic components. Spring 340 may be connected to cushion piston 320 and transmission piston 310 and configured to resist the movement of cushion piston 320 away from clutch plate 330. Spring 345 may be connected to cushion piston 320 and transmission piston 310 and configured to resist the movement of cushion piston 320 toward clutch plate 330. Springs 340, 345 may be designed to resist movement when they are compressed or extended. Springs 340, 345 may work together or separately to minimize the movement of cushion piston 320 within transmission piston 310. Springs 340, 345 may also provide resistance to the movement of transmission piston 310 toward clutch plate 330. The movement of transmission piston 310 may also be resisted by varying the size and number of cushion pistons 320. The resistance provided by coupling transmission piston 310 to cushion piston 320 may serve to advantageously decelerate transmission piston 310 before it engages clutch plate 330. Decelerating transmission piston 310 immediately before it engages clutch plate 330 may help to provide a smooth engagement or disengagement of clutch elements.

A pressurized fluid 350 acts on transmission piston 310 and cushion piston 320 substantially simultaneously. The pressurized fluid may consist of traditional clutch fluid, traditional brake fluid, oil, water, air, nitrogen, or any other gas or liquid suitable to compress a piston. The pressurized fluid 350 tends to move transmission piston 310 and cushion piston 320 in a direction toward clutch plate 330. The speed that transmission piston 310 and cushion piston 320 move toward clutch plate 330 is proportional to the pressure of pressurized fluid 350. A nominal, or resting pressure, of pressurized fluid 350 may tend not to induce movement in transmission piston 310 or cushion piston 320. The resting pressure may vary depending on the specific application and design tolerances of the components. Maintaining pressurized fluid 350 at a resting pressure that is above ambient pressure, but below an acting pressure that induces movement in transmission piston 310 or cushion piston 320 may advantageously decrease the time for pressurized fluid 350 to flow into and out of the area surrounding transmission piston 310 and cushion piston 320 by decreasing the pressure rise required for pressurized fluid 350 to reach the acting pressure. An algorithm may utilize the resting pressure to speed the action of transmission piston 310 and cushion piston 320 and aid in the calibration of transmission piston decelerator unit 300. Similar to FIG. 2, clutch plates 330 and 335 may represent multiple sets of clutch plates that are sandwiched together in traditional transmission clutch pack assemblies that may rotate together as a unit when they are compressed together by transmission piston 310.

FIG. 3A depicts the initial operation (time 1) of the transmission piston decelerator unit 300, when pressurized fluid 350 begins to act on both transmission piston 310 and cushion piston 320. Transmission piston 310 and cushion piston 320 are induced to move toward clutch plates 330, 335 by pressurized fluid 350.

FIG. 3B depicts subsequent operation (time 2) of transmission piston decelerator unit 300, when cushion piston 320 engages clutch plate 330. Cushion piston 320 substantially ceases movement upon engagement with clutch plate 330. Pressurized fluid 350 continues to act on transmission piston 310 and cushion piston 320, causing transmission piston 310 to continue to move toward clutch plate 330. The movement of transmission piston 310 toward clutch plate 330 may be resisted by the coupling of transmission piston 310 to cushion piston 320. The continued movement of transmission piston 310 toward clutch plate 330 combined with the stopped movement of cushion piston 320 may cause springs 340, 345 to compress and extend. The compression and extension of springs 340, 345 may resist the movement of transmission piston 310 toward clutch plate 330. The resistance provided by the coupling of transmission piston 310 to cushion piston 320 may decelerate transmission piston 310 before it engages clutch plate 330.

FIG. 3C depicts a further subsequent operation (time 3) of the transmission piston decelerator unit 300, when transmission piston 310 has engaged clutch plate 330. Pressurized fluid 350 continues to act on transmission piston 310 and cushion piston 320, causing transmission piston 310 to apply pressure on clutch plate 330. Cushion piston 320 may remain engaged with clutch plate 330. Clutch plate 330 may move toward and smoothly engage clutch plate 335. Transmission piston 310 compresses clutch plate 330 and clutch plate 335 together, causing any torque from one clutch plate to be transferred to the other clutch plate. A reduction in the pressure of pressurized fluid 350 may disengage transmission piston 310 from clutch plate 330 and may cause clutch plate 330 to separate from clutch plate 335.

Figure 4:
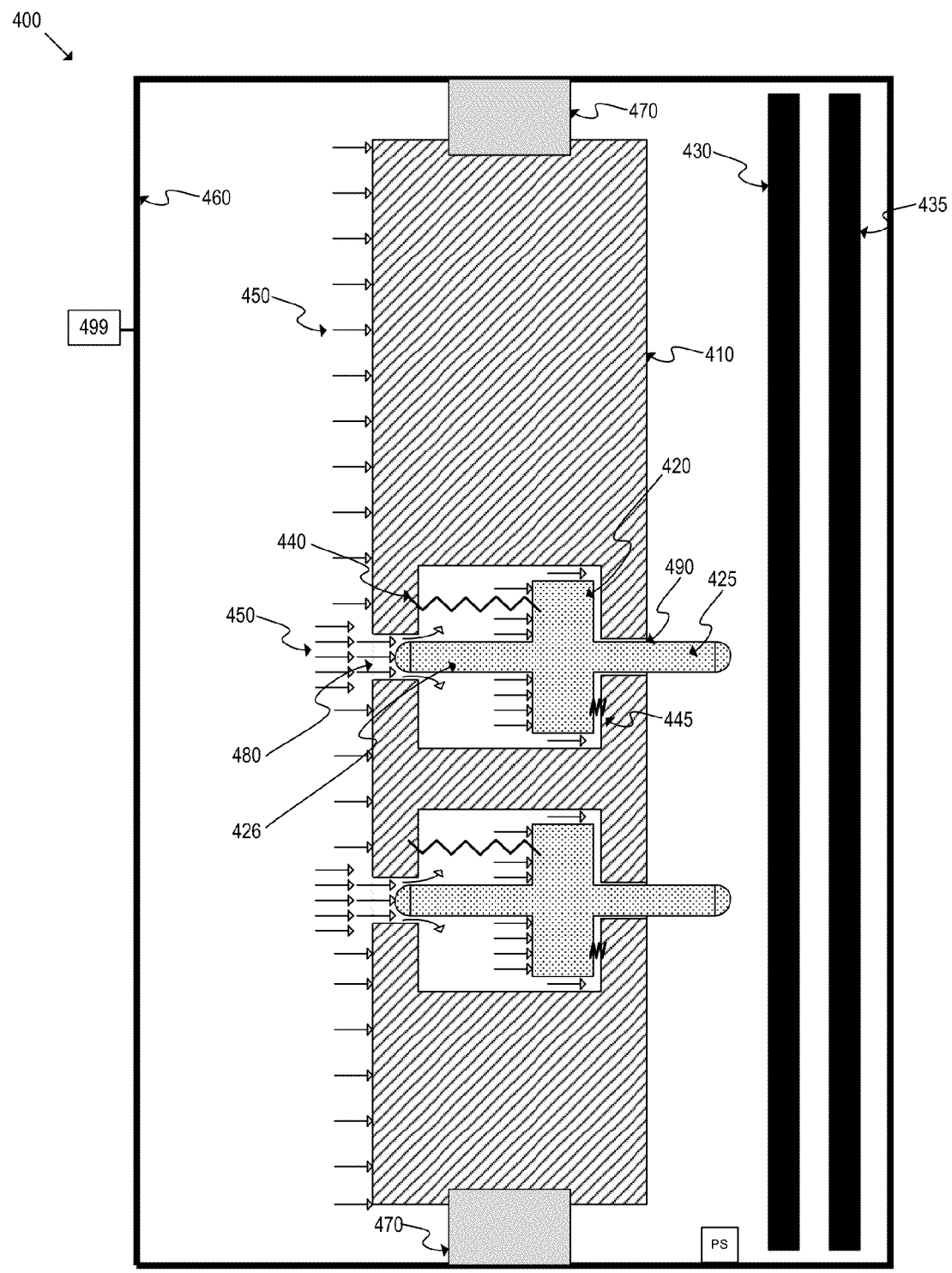
FIG. 4 is an illustration of a transmission piston and clutch plates that includes a cushion piston according to another embodiment of the invention.

FIG. 4 depicts a mechanical illustration of a transmission piston decelerator unit 400 according to another embodiment of the invention. Pressurized fluid 450 may be introduced into housing 460 by a fluid source 499 such as a compressor or pump. Transmission piston 410 may substantially contain cushion piston 420. Multiple cushion pistons 420 may be substantially contained in a single transmission piston 410. The location of cushion piston 420 is not restricted to the vertical midpoint of transmission piston 410, cushion piston 420 may be located anywhere within transmission piston 410. Cushion pistons 420 may be nested within each other, providing a multi-stage or telescoping cushion piston 420. Cushion piston 420 may have a substantially cylindrical shape or may be any other shape, for example rectangular or octagonal. Increased pressure of pressurized fluid 450 may move transmission piston 410 and cushion piston 420 toward clutch plates 430, 435. Pressurized fluid 450 may act on transmission piston 410 and cushion piston 420 substantially simultaneously. Aperture 480 may allow pressurized fluid 450 to act on cushion piston 420. Aperture 480 may be designed to allow a predetermined amount of pressurized fluid 450 to act on cushion piston 420. Seals 470 prevent pressurized fluid 450 from acting on clutch plates 430, 435. Seals 470 may consist of mechanical labyrinths, rings, or gaskets composed of rubber, metal, fiber, or paper.

Pressurized fluid 450 may act on substantially all sides of cushion piston 420 depending on the location of cushion piston 420 within transmission piston 410 and the direction of movement of cushion piston 420 and transmission piston 410. Allowing pressurized fluid 450 to flow to substantially all sides of cushion piston 420 equalizes the pressure acting on cushion piston 420, preventing cushion piston 420 from exerting substantial force on clutch plate 430. Additionally, allowing pressurized fluid 450 to flow to substantially all sides of cushion piston 420 may help to maintain a constant flow and speed of pressurized fluid 450 throughout the motion of transmission piston 410 toward clutch plate 430.

Cushion piston 420 includes segments that may extend outside transmission piston 410, depending on the location of cushion piston 420 within transmission piston 410. Cushion piston segment 425 extends toward clutch plate 430. Cushion piston segment 426 extends away from clutch plate 430. Cushion piston segments 425, 426 may have a substantially cylindrical shape or may be any other shape, for example rectangular or octagonal. Cushion piston segments 425, 426 may serve to guide the motion of cushion piston 420 within transmission piston 410 and may also allow a predetermined amount of pressurized fluid 450 to act on cushion piston 420. Aperture 490 in transmission piston 410 may allow cushion piston segment 425 to extend outside transmission piston 410. Aperture 490 is substantially fluid tight and may contain a seal (not shown). Cushion piston segment 425 may engage clutch plate 430 at a time before transmission piston 410 engages clutch plate 430 when both transmission piston 410 and cushion piston 420 are moving toward clutch plate 430. The distance cushion piston segment 425 extends outside of transmission piston 410 and the time cushion piston segment 425 engages clutch plate 430 before transmission piston 410 may be varied based on the particular application of the transmission piston decelerator unit 400. For example, the distance and time may be selected based on the amount of deceleration required, pressure of the fluid, the velocity of the transmission piston, the force applied by the transmission piston, or the distance from the transmission piston to the clutch plate.

Springs 440, 445 mechanically couple transmission piston 410 and cushion piston 420. Coupling transmission piston 410 and cushion piston 420 together allows the pistons to transfer force and motion between each other while allowing for a predetermined freedom of movement between them. A single cushion piston 420 is shown in FIG. 4; however, multiple cushion pistons 420 may be coupled to a single transmission piston 420, depending on the application. Two springs are shown in FIG. 4; however, multiple springs and multiple spring strengths may be used in each application depending on the force and freedom of movement desired. Spring 440 may be configured to resist the movement of cushion piston 420 away from clutch plate 430. Spring 445 may be configured to resist the movement of cushion piston 420 toward clutch plate 430. Springs 440, 445 may work together to minimize the movement of cushion piston 420 within transmission piston 410. Springs 440, 445 may also provide resistance to the movement of transmission piston 410 toward clutch plate 430 when cushion piston segment 425 engages clutch plate 430 before transmission piston 410 engages clutch plate 430. Varying the number and strength of springs 440, 445 may adjust the amount of resistance cushion piston 420 provides to transmission piston 410. The resistance provided by coupling transmission piston 410 to cushion piston 420 may serve to advantageously decelerate transmission piston 410 before it engages clutch plate 430.

Figure 5:
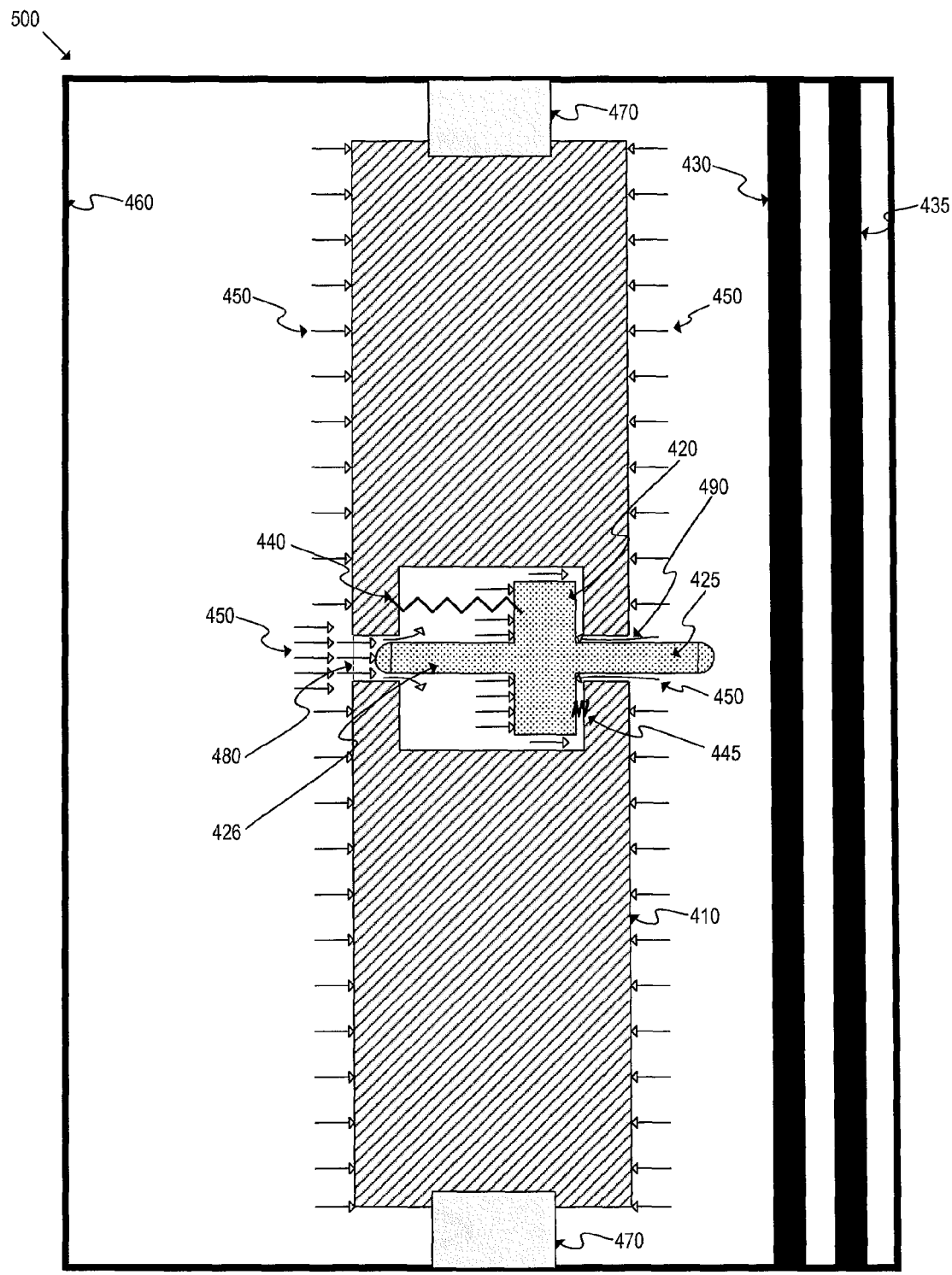
FIG. 5 is an illustration of a double acting transmission piston and clutch plates that includes a cushion piston according to another embodiment of the invention.

FIG. 5 depicts a mechanical illustration of a transmission piston decelerator unit 500 according to another embodiment of the invention. In this embodiment, pressurized fluid 450 may be introduced into housing 460 on either side of transmission piston 410 by a fluid source (not shown) such as a compressor or pump. Transmission piston 410 and cushion piston 420 may be induced to move either toward or away from clutch plates 430, 435 by introducing pressurized fluid 450 on one side or the other, respectively, of transmission piston 410. Pressurized fluid 450 introduced on the side of transmission piston 410 farthest from clutch plates 430, 435 may move transmission piston 410 and cushion piston 420 toward clutch plates 430, 435, eventually causing clutch plates 430 and 435 to compress together and transfer torque from one clutch plate to the other. Conversely, pressurized fluid 450 introduced on the side of transmission piston 410 closest to clutch plates 430, 435 may move transmission piston 410 and cushion piston 420 away from clutch plates 430, 435, allowing clutch plates 430 and 435 to separate and cease transferring torque from one clutch plate to the other.

In this embodiment, aperture 490 in transmission piston 410 may allow pressurized fluid 450 to act on cushion piston 420 at substantially the same time as pressurized fluid 450 acts on transmission piston 410. Aperture 490 may be designed to allow a predetermined amount of pressurized fluid 450 to act on cushion piston 420.

Figure 6:
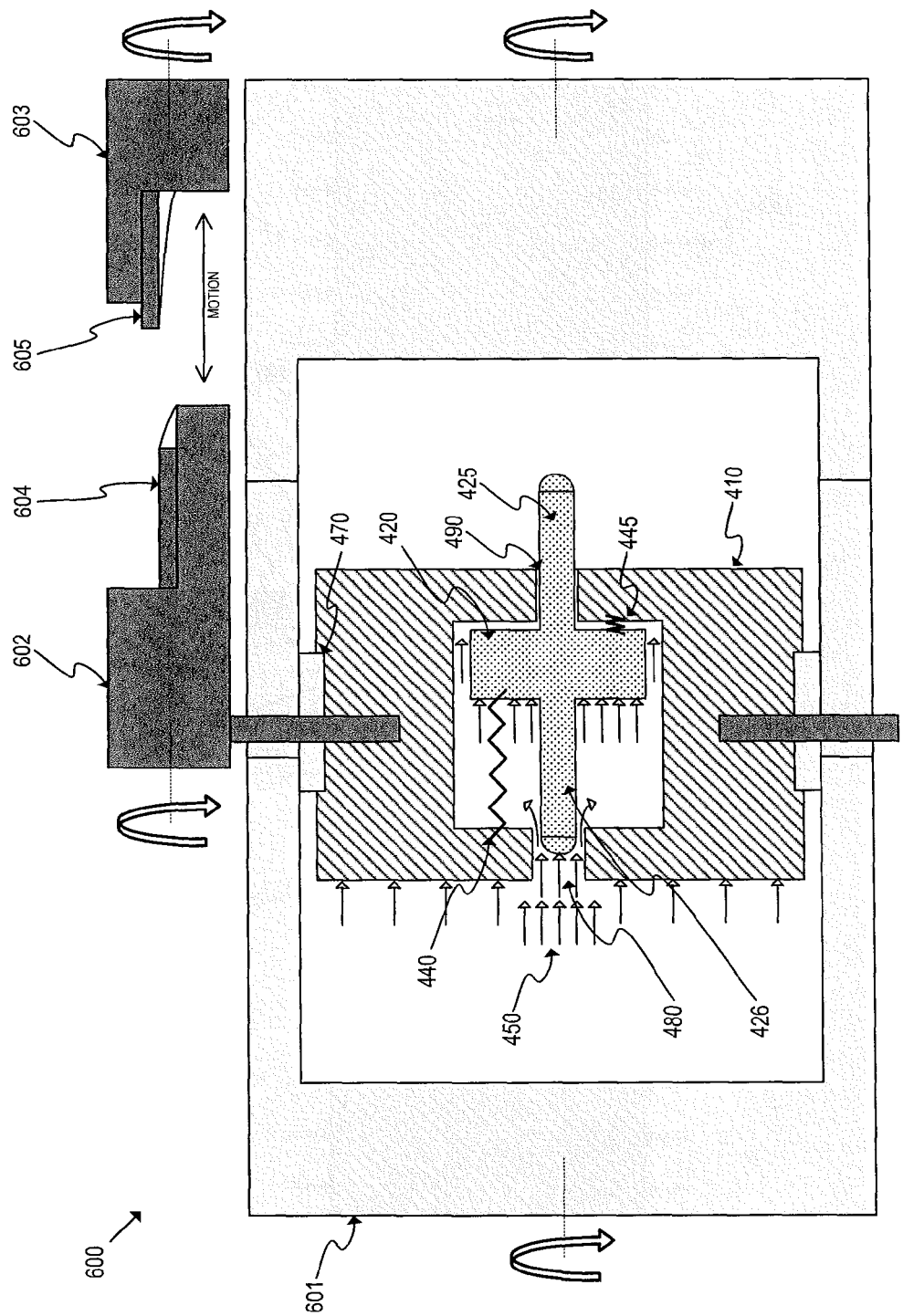
FIG. 6 is an illustration of a transmission piston and a dog clutch that includes a cushion piston according to another embodiment of the invention.

FIG. 6 depicts a mechanical illustration of a transmission piston decelerator unit 600 according to another embodiment of the invention. In this embodiment, transmission piston decelerator unit 600 may be utilized in a rotating dog clutch configuration. Transmission piston 410 and cushion piston 420 may be contained in rotating shaft 601, for example, a transmission input or output shaft. Pressurized fluid 450 may be introduced into rotating shaft 601 by a fluid source (not shown) such as a compressor or pump. Transmission piston 410 may substantially contain cushion piston 420. Multiple cushion pistons 420 may be substantially contained in and act on a single transmission piston 410. The location of cushion piston 420 is not restricted to the vertical midpoint of transmission piston 410, cushion piston 420 may be located anywhere within transmission piston 410. Cushion pistons 420 may be nested within each other, providing a multi-stage or telescoping cushion piston 420. Similar to other embodiments, cushion piston 420 may be coupled to transmission piston 410 by springs 440, 445 and may be configured to resist the movement of transmission piston 410.

Increased pressure of pressurized fluid 450 may cause transmission piston 410 and cushion piston 420 to move axially within rotating shaft 601. Transmission piston 410 may be connected to dog clutch rotating element 602. Axial movement of transmission piston 410 may cause dog clutch rotating element 602 to move toward dog clutch rotating element 603. Dog clutch rotating element 603 may be connected to another rotating shaft (not shown), for example, a transmission input or output shaft. Spline 604 attached to dog clutch rotating element 602 may engage spline 605 attached to dog clutch rotating element 603. Engaging splines 604 and 605 may cause dog clutch rotating elements 602 and 603 to rotate together and transfer torque from rotating shaft 601 to dog clutch rotating element 603.

Cushion piston 420 may reach rotating shaft 601 at a time before dog clutch element 602 engages dog clutch element 603. Cushion piston 420 may resist the movement of transmission piston 410 and dog clutch element 602 toward dog clutch element 603, which may advantageously decelerate dog clutch element 602 before it engages dog clutch element 603. Decelerating dog clutch element 602 before it engages dog clutch element 603 may aid in synchronizing the rotation of the elements by expanding the range of acceptable synchronization speeds and by absorbing synchronization errors.

Figure 7:
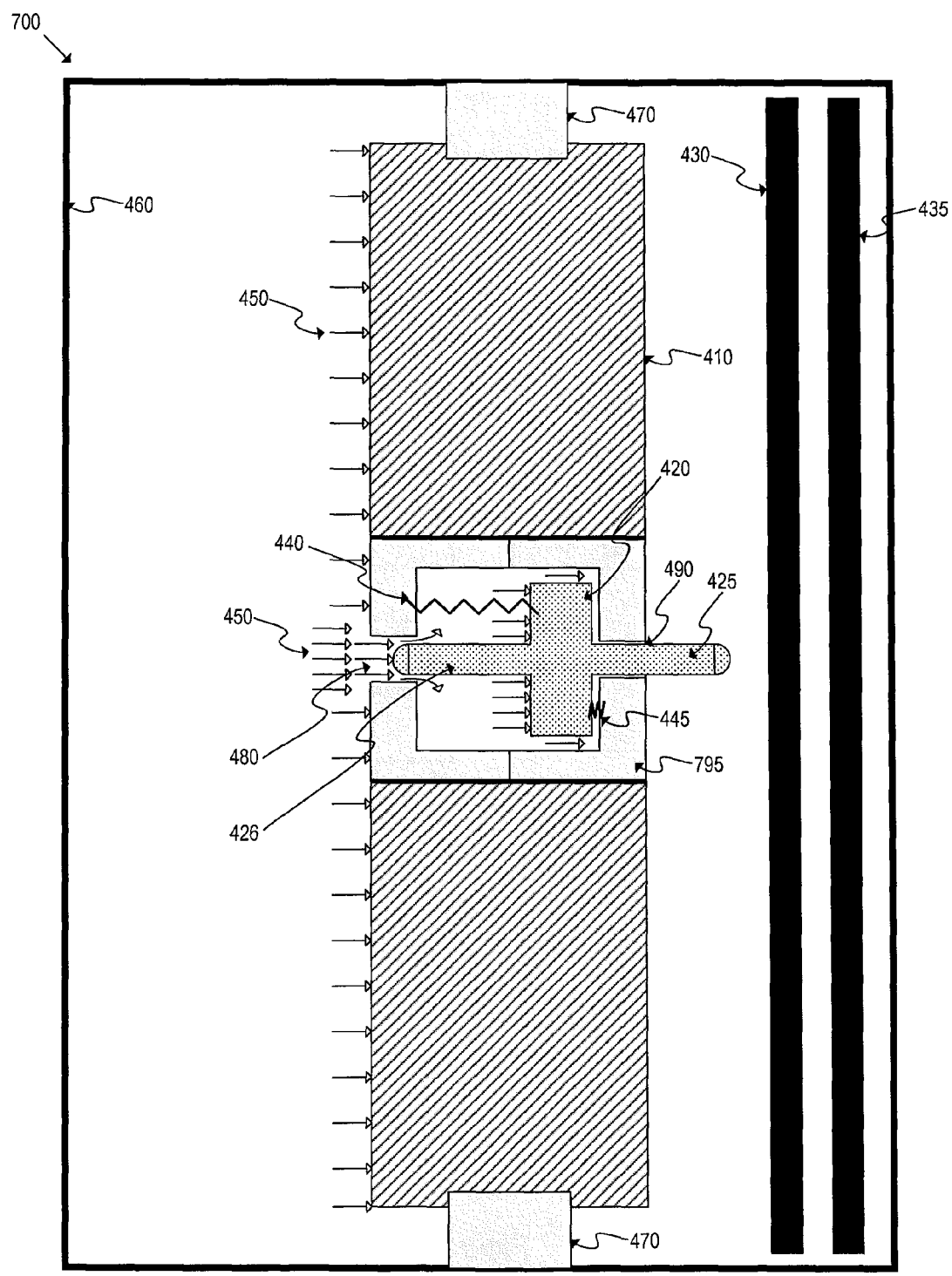
FIG. 7 is an illustration of a transmission piston and clutch plates that includes a cushion piston according to another embodiment of the invention.

FIG. 7 depicts a mechanical illustration of a transmission piston decelerator unit 700 according to another embodiment of the invention. In this embodiment, cushion piston 420 may be located in housing unit 795. Housing unit 795 may be a modular unit separate from transmission piston 410. Housing unit 795 may be created separately from transmission piston decelerator unit 700 and may be added as a completed unit. Cushion piston 420 may be placed in housing unit 795 before housing unit is added to transmission piston 410. Alternatively, housing unit 795 may be constructed of several pieces that are joined together during assembly with transmission piston 410. Cushion piston 420 may be added during assembly. Housing unit 795 may be attached to transmission piston 410 by, for example, threading, pressing, stamping, or any other known method to join two separate parts together.

Multiple housing units 795, each containing cushion pistons 420, may be attached to transmission piston 410. The location of housing unit 795 is not restricted to the vertical midpoint of transmission piston 410, housing unit 795 may be located anywhere within transmission piston 410. Housing unit 795 may be used in any type of clutch application, such as clutches with axially moving clutch plates or rotating dog clutch elements.

Figure 8:
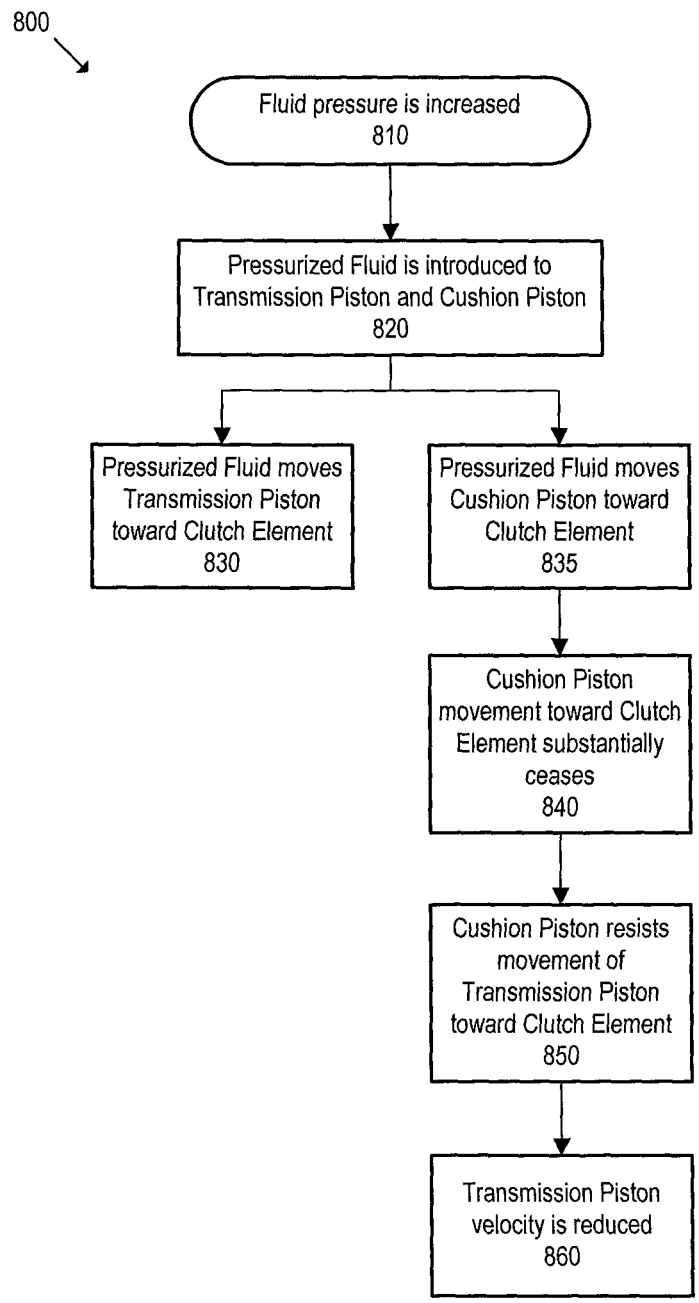
FIG. 8 is a flow diagram of a method for decelerating a transmission piston equipped with a cushion piston according to another embodiment of the invention.

FIG. 8 illustrates method 800 for decelerating a transmission piston according to one embodiment of the invention. The method begins with step 810 in which the pressure of a fluid is increased. Step 820 involves introducing the pressurized fluid to both a transmission piston and cushion piston that is coupled to the transmission piston at substantially the same time. Step 830 involves using the pressurized fluid to begin movement of the transmission piston toward a clutch element. Step 835 involves using the pressurized fluid to begin movement of the cushion piston toward a clutch element. Steps 830 and 835 may happen at substantially the same time. In step 840, the cushion piston's movement toward the clutch element substantially ceases. In step 850, the cushion piston resists the movement of the transmission piston toward the clutch element. In step 860, the velocity of the transmission piston is reduced.

The disclosed embodiments may include additional components and accessories not shown here. For example, the locations of the transmission piston and cushion piston may be ascertained by a position sensor PS (as shown in FIG. 4). The position sensor PS may be in communication with a control device, such as a processor. The control device may vary other parameters based on the locations of the transmission piston and cushion piston.

While various embodiments of the invention have been described, it will be apparent to those of ordinary skill in the art that many more embodiments and implementations are possible within the scope of the invention. Accordingly, the invention is not to be restricted except in light of the attached claims and their equivalents.

I claim:

1. A transmission shifting element decelerator comprising:
    a first piston;
    a pressurized fluid configured to move the first piston in a direction perpendicular to a face of a clutch plate; and
    a second piston movably mounted within the first piston and configured to allow the pressurized fluid to move the second piston in the direction perpendicular to the clutch plate;
    a first spring connected between the first piston and the second piston and configured to resist movement of the second piston in a direction toward the clutch plate; and
    a second spring connected between the first piston and the second piston and configured to resist movement of the second piston in a direction away from the clutch plate,
    wherein a portion of the second piston extends outside of the first piston and engages the clutch plate before the first piston engages the clutch plate.

2. The decelerator of claim 1, wherein the pressurized fluid actuates the first piston and the second piston substantially simultaneously.

3. The decelerator of claim 1, wherein the second piston has a cylindrical main body with a first diameter configured to enable movement of the second piston by the pressurized fluid,
    wherein the second piston has a first portion that extends outside the first piston in the direction toward the clutch plate,
    wherein the second piston has a second portion that extends outside the first piston in the direction away from the clutch plate,
    wherein the first and second portions of the second piston extending outside of the first piston have cylindrical shapes with cylindrical axes coaxial with the cylindrical main body of the second piston, and
    wherein the cylindrical shapes of the extended portions of the second piston have a second diameter that is smaller than the first diameter.

4. The decelerator of claim 3, wherein the pressurized fluid contacts all sides of the cylindrical main body of the second piston.

5. The decelerator of claim 4, wherein the first piston has a first aperture and a second aperture,
    wherein the first aperture allows the pressurized fluid to contact the second piston; and
    wherein the second aperture allows the second piston to engage the clutch plate.

6. The decelerator of claim 5, wherein the first aperture regulates a flow of the pressurized fluid to the second piston.

7. The decelerator of claim 1, wherein the second piston recedes into the first piston when the second piston engages the clutch plate.

8. The decelerator of claim 1, wherein the second piston does not apply substantial pressure on the clutch plate when the first piston is substantially engaged with the clutch plate.

9. The decelerator of claim 1, wherein a velocity of the first piston and a velocity of the second piston are proportional to a pressure of the pressurized fluid.

10. The decelerator of claim 1, wherein the second piston does not engage the clutch plate when a pressure of the pressurized fluid is at a first predetermined level.

11. The decelerator of claim 1, wherein the first spring has a first strength and the second spring has a second strength; and
    wherein the first strength is greater than the second strength.

12. The decelerator of claim 1, wherein a time between the engagement of the second piston with the clutch plate and the engagement of the first piston with the clutch plate varies based on a parameter, wherein the parameter is selected from a group consisting of
    a pressure of the pressurized fluid;
    a velocity of the first piston;
    a direction of movement of the first piston; and
    a distance from the first piston to the clutch plate.

13. The decelerator of claim 1, further comprising a housing unit attached to the first piston, wherein the second piston is located in the housing unit.

14. The decelerator of claim 1, further comprising a position sensor configured to measure a linear location of the first piston and the second piston relative to the clutch plate.

15. The decelerator of claim 14, wherein the sensor is in communication with a source of the pressurized fluid.

16. The decelerator of claim 1, wherein the second piston comprises multiple pistons movably mounted within the first piston.

17. The decelerator of claim 1, further comprising a housing that substantially contains the first piston and the second piston and a plurality of seals placed between the first piston and the housing, wherein the seals are fluid-tight.

18. A transmission shifting element decelerator comprising:
    a first piston;
    a pressurized fluid configured to move the first piston toward a clutch element;
    a second piston movably mounted within the first piston and configured to allow the pressurized fluid to move the second piston toward the clutch element;

a first spring connected between the first piston and the second piston and configured to resist movement of the second piston in a direction toward the clutch element; and a second spring connected between the first piston and the second piston and configured to resist movement of the second piston in a direction away from the clutch element, wherein a portion of the second piston extends outside of the first piston and movement of the second piston toward the clutch element ceases before movement of the first piston toward the clutch element ceases.

\* \* \* \* \*